US008756589B2

(12) United States Patent
Manchanda et al.

(10) Patent No.: US 8,756,589 B2
(45) Date of Patent: Jun. 17, 2014

(54) SELECTABLE DUAL-MODE JIT COMPILER FOR SIMD INSTRUCTIONS

(75) Inventors: Sachin Manchanda, Hyderabad (IN); Anand Rengasamy, Hyderabad (IN); Pratap Lakshman, Hyderabad (IN); Srivatsan Kidambi, Hyderabad (IN); Ramesha Chandrashekhar, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 13/160,496

(22) Filed: Jun. 14, 2011

(65) Prior Publication Data

US 2012/0324429 A1 Dec. 20, 2012

(51) Int. Cl.
*G06F 9/45* (2006.01)
(52) U.S. Cl.
USPC .......................................... 717/148; 717/140
(58) Field of Classification Search
None
See application file for complete search history.

(56) References Cited

U.S. PATENT DOCUMENTS

| 6,139,199 | A | 10/2000 | Rodriguez | |
|---|---|---|---|---|
| 6,718,457 | B2 | 4/2004 | Tremblay et al. | |
| 7,275,241 | B2 | 9/2007 | Choi et al. | |
| 2007/0294665 | A1* | 12/2007 | Papakipos et al. | 717/119 |
| 2008/0141012 | A1* | 6/2008 | Yehia et al. | 712/226 |
| 2010/0277486 | A1 | 11/2010 | Bhoovaraghavan | |

OTHER PUBLICATIONS

Nuzman, et al., "Vapor SIMD: Auto-Vectorize Once, Run Everywhere", Retrieved at <<http://www.irisa.fr/alf/downloads/rohou/doc/Rohou_CG011.pdf>>, International Symposium on Code Generation and Optimization, Retrieved Date: Apr. 11, 2011, pp. 10.
Bohm, et al., "Generalized Just-In-Time Trace Compilation using a Parallel Task Farm in a Dynamic Binary Translator", Retrieved at <<http://groups.inted.ac.uk/pasta/papers/pldi044-bohm.pdf>>, Jun. 4-8, 2011, pp. 12.
Kulkarni, et al., "JIT Compilation Policy on Single-Core and Multicore Machines", Retrieved at http://www.ittc.ku.edu/~kulkarni/CARS/papers/interact11.pdf>>, Retrieved Date: Apr. 11, 2011, pp. 8.
Chichon, et al., "SAMIRA: A SIMD-DSP architecture targeted to the MatlabTM source language", Retrieved at <<http://citeseerx.ist.psu.edu/viewdoc/download?doi=10.1.1.68.3682&rep=rep1&type=pdf>>, Retrieved Date: Apr. 11, 2011, pp. 6.
Ha, et al., "A Concurrent Trace-based Just-In-Time Compiler for JavaScript", Retrieved at <<http://citeseerx.ist.psu.edu/viewdoc/download?doi=10.1.1.149.2225&rep=rep1&type=pdf>>. Retrieved Date: Apr. 11, 2011, pp. 11.
"NEON/SIMD support in ARM", Retrieved at http://infocenter.arm.com/help/topic/com.arm.doc.dht0002a/DHT0002A_introducing_neon.pdf>>, Jun. 2, 2009, pp. 18.

* cited by examiner

*Primary Examiner* — Chuck Kendall
(74) *Attorney, Agent, or Firm* — Kevin Sullivan; Brian Haslam; Micky Minhas

(57) ABSTRACT

A JIT (Just-In-Time) compiler performs dual-mode code generation by determining whether an application has opted-in to SIMD (Single Instruction Multiple Data) code generation both at JIT-time and at runtime. The application may select the code generation mode by identifying whether it has opted-in to SIMD code generation. As a result, the underlying implementation guarantees application compatibility by allowing the application to select the code generation mode. Additionally, applications have the ability to select into different code generation modes during concurrent execution.

18 Claims, 3 Drawing Sheets

SELECTABLE DUAL-MODE JIT COMPILER FOR SIMD INSTRUCTIONS

BACKGROUND

Modern processors support vector processing extensions to their instruction set. For example, NEON™ is a vector processing extension to the ARM architecture that provides SIMD (Single Instruction Multiple Data) instructions for performing data-parallel calculations. In the case of NEON™, when the data has a floating-point value, the data must be a single-precision floating-point value. Operating systems designed to run on ARM-based processors may use the .NET Compact Framework as the CLR (Common Language Runtime) that runs the managed code.

Developers view the CLR as abstracting away hardware, but also expect to be able to take advantage of new hardware innovations so that the capabilities of managed code do not fall behind that of native code. Exposing SIMD instructions allows developers to write data-parallel algorithms directly in .NET languages and to utilize data-parallel compute resources, which helps keep managed implementations within range of native performance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a JIT compiler is capable of dual-mode code generation, which supports both application code that calls directly into a SIMD-enabled method, and application code that calls into a shared method that in turn calls into a SIMD-enabled method. For application code calling into a SIMD-enabled method, code generation is conditioned on a "JIT-time check" of the application's preferred mode for performing floating-point calculations. In the case of client code calling into a shared method that in turn calls into a SIMD-enabled method, dual-mode code generation is performed and method dispatch is conditioned on a "runtime check" of the application's preferred mode of floating-point calculations.

In one embodiment, a JIT compiler identifies a SIMD-enabled method call in application code. The JIT compiler determines whether the application code has opted-in to SIMD code generation. If the application code has not opted-in, then the JIT compiler emits native code comprising a call instruction to the method. If the application code has opted-in, then the JIT compiler determines whether the method call originated from the application code or from platform code. If the method call originated from application code, the JIT compiler generates SIMD instructions for the method and inlines the SIMD instructions into a calling method. If the method call originated from platform code, the JIT compiler performs code generation with a runtime check.

In another embodiment, a system comprises a computer processor and a JIT compiler running on the computer processor. The JIT compiler detects, in application code, a call from a calling method into a SIMD-enabled method. The JIT compiler is further operable to identify a selected code generation mode for the application code. The JIT compiler is operable to emit a call instruction to the SIMD-enabled method, if the application code has not selected SIMD operation.

The JIT compiler is operable to generate SIMD instructions for the SIMD-enabled method and to inline the SIMD instructions into the calling method, if the application code has selected SIMD operation. The JIT compiler is operable to identify the selected code generation mode for the application code at JIT-time and at runtime. The JIT compiler may compile code for a first application that selected SIMD operation while concurrently compiling code for a second application that did not select SIMD operation.

In another embodiment, a computer readable storage medium stores computer executable instructions for controlling a computing device to perform a method comprising: receiving application code for a plurality of applications at a JIT compiler; determining a code generation mode selected by each of the applications; generating first native code for applications that selected a first code generation mode; and generating second native code for applications that selected a second code generation mode.

The code generation mode may be selected from a single-precision mode and a double-precision mode. The code generation mode may be a SIMD-enabled mode. The JIT compiler may generate SIMD instructions, and inlines the SIMD instructions in the application code. The code generation mode selected by each of the applications may be determined at JIT-time or at runtime.

DRAWINGS

DETAILED DESCRIPTION

Figure 1:
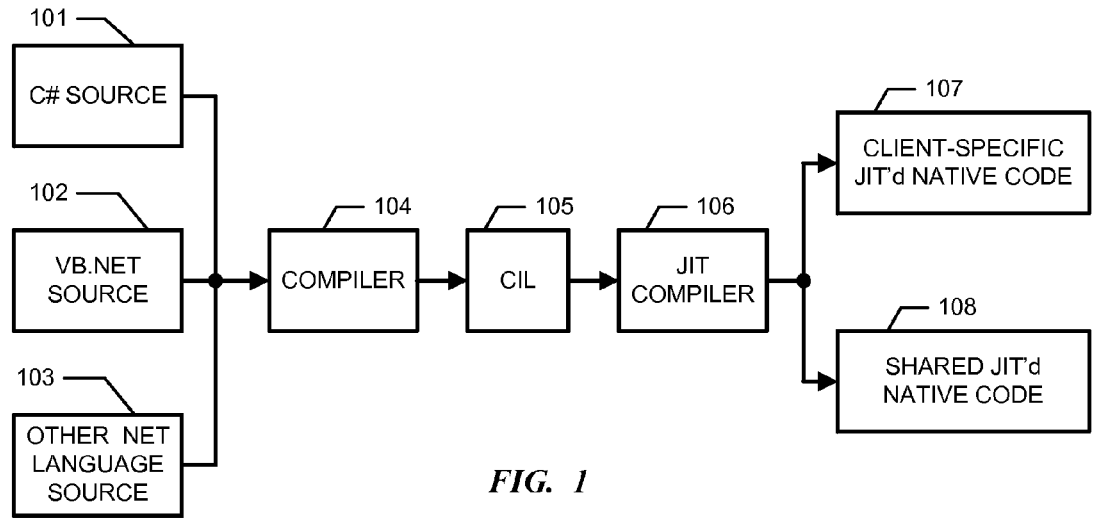
FIG. 1 is a high level overview of one embodiment of a system employing dual-mode code generation.

Historically, the NET Compact Framework JIT (Just-In-Time) compiler has emitted code that performs all arithmetic operation on floating-point values using double precision. If this arithmetic was instead performed in single precision, then there would be subtle difference in the results that would break the backwards-compatibility of existing applications.

Additionally, given that a device may be memory constrained, the .NET Compact Framework CLR allows managed code from a predefined "trusted platform" assembly to have its JIT'd native code shared across multiple applications. Such code is JIT'd only once. The code then resides in a shared JIT cache. For application compatibility, such shared code cannot make any assumption about the mode (i.e. single precision or double precision) in which an application would prefer to perform floating-point calculations.

In the view of these constraints, a selectable dual-mode JIT compiler provides the performance benefits of data-parallel calculations in a manner that guarantees backwards compatibility for applications.

Although the examples and illustrations described herein relate specifically to SIMD instructions, it will be understood by those of ordinary skill in the art that these concepts relate generically to dual-mode code generation by a JIT compiler and to providing applications with the capability to select the mode of their choice. As a result, both modes may be in effect at the same time, thereby enabling a heterogeneous set of applications to execute concurrently.

A specific set of methods have been identified that the .NET Compact Framework JIT Compiler can compile into SIMD instructions. Such methods are considered "SIMD enabled," and such compiled code will perform arithmetic in single precision.

In the case of dual-mode code generation, the .NET Compact Framework JIT compiler generates code that can perform arithmetic in both single precision (which provides greater speed) and double precision (which provides greater precision). Multiple applications running concurrently can select the code generation mode (i.e. single-precision mode or double-precision mode) of their choice. For instance, legacy applications that have been tested under the double precision mode of arithmetic operations may select the double-precision code generation mode, while another concurrently running application may select the faster, single-precision code generation mode.

Embodiments of the invention are directed to dual-mode code generation by a JIT compiler. Applications may select the code generation mode, which allows the underlying implementation to guarantee application compatibility. In other embodiments, applications may select into different code generation modes during concurrent execution.

Dual-mode code generation by a JIT compiler addresses two user scenarios:
(1) application code directly calling into a SIMD-enabled method; and
(2) application code calling into a "shared" method that in turn calls into a SIMD-enabled method.

In the case of application code calling into a SIMD-enabled method, the code generation is conditioned on a "JIT-time check" of the application's preferred mode for performing floating-point calculations.

In the case of client code calling into a "shared" method that in turn calls into a SIMD-enabled method, dual-mode code generation is performed and method dispatch is conditioned on a "runtime check" of the application's preferred mode of floating-point calculations.

Pseudo code illustrating the operation of the JIT compiler in these two scenarios is illustrated below.

In one embodiment, application code call directly into a SIMD enabled method. For classes C1 and C2 and methods M1 and M2, consider C1::M1( ) calling into C2::M2( ) where C2::M2( ) is SIMD-enabled managed code belonging to a trusted platform assembly.

Code generation is conditioned on a "JIT-time check" of the application's preference as illustrated in the following pseudo code:

```
if (app_prefers_doubleprecision) {   // this is a "JIT-time" check of the
                                     // application's preference,
    emit a "call" instruction to     // the method in turn will be JIT'd
    C2::M2( );                       //"as usual" to perform arithmetic
                                     //in double precision.
}
else {
    generate SIMD instructions for C2::M2( ) and inline it into C1::M1( );
}
```

In another embodiment, application code calls into a "shared" method that in turn calls into a SIMD-enabled method. For classes C1 and C2 and methods M1 and M2, consider C1::M1( ) calling into Cx::Mx( ) which in turn calls into C2::M2( ) where C2::M2( ) is SIMD-enabled and both Cx::Mx and C2::M2( ) belong to a trusted platform assembly.

Code generation involves emitting a call instruction to the callee as well as inlining SIMD instructions into the caller, and method dispatch is conditioned on a "runtime check" of the application's preference. The code generated for Cx::Mx( ) will be as follows:

```
if (app_prefers_doubleprecision) {   // this is a "runtime" check of the
                                     // application's preference,
    emit a "call" instruction to     // the method in turn will be JIT'd
    C2::M2( );                       // "as usual" to perform arithmetic
                                     //in double precision.
}
else {
    generate SIMD instructions for C2::M2( ) and inline it into Cx::Mx( );
}
```

FIG. 1 is a high level overview of one embodiment of a system employing dual-mode code generation. A developer creates source code in a managed .NET language, such as C# 101, VISUAL BASIC® 102, or any other .NET language 103, such as languages comply with Common Language Specification (CLS) rules. The source code is compiled in compiler 104, which may be specific to the source code language. Compiler 104 creates a common intermediate language (CIL) 105.

JIT compiler 106 consumes the CIL and emits native code. According to embodiments of the invention, JIT compiler 106 may put the native code in one of two compartments. Client-specific JIT'd native code 107 holds native code for applications that call directly into a SIMD-enabled method. This code is conditioned on a JIT-time check. Shared JIT'd native code 108 holds native code for applications that call into shared method. This code is conditioned on a runtime check.

Figure 2:
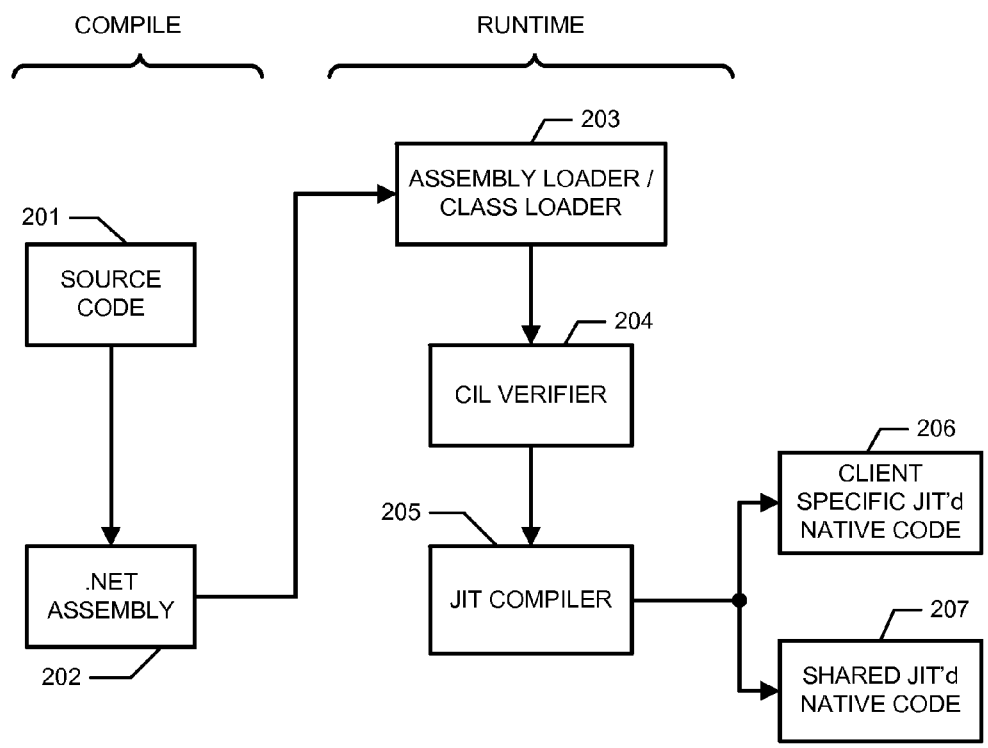
FIG. 2 is an overview of another embodiment of a system employing dual-mode code generation.

FIG. 2 is an overview of another embodiment of a system employing dual-mode code generation. Source code 201 from a .NET managed language is created by a developer. Source 201 is compiled into a .NET assembly 202, which may be, for example, a compiled code library in CIL. The code may be stored in any volatile or non-volatile memory, such as a random access memory, a hard drive, flash memory, an optical storage device, network storage device, or disk.

At runtime, the CIL is loaded by assembly/class loader 203 and verified by CIL verifier 204. The CIL is then complied into machine language by the Common Language Runtime (CLR) JIT compiler 205, which recognizes whether the developer has requested either single precision or double precision for the application. In one embodiment, the developer may set an attribute flag in the source code that indicates whether the application has opted-in to SIMD code generation. The attribute is applied at the assembly level and goes to the Dynamic Link Library (DLL).

If JIT compiler 205 identifies application code that calls directly into a SIMD-enabled method, then it stores the native code in client-specific compartment 206. A JIT-time check of the application's preferred mode for handling floating point calculations is performed when calls to a SIMD-enabled method are observed. If the application prefers double precision, then JIT compiler 205 emits a "call" instruction to the called method. If the application prefers single precision, then JIT compiler 205 generates SIMD instructions for the called method and inlines the SIMD instructions into the calling method.

If JIT compiler 205 identifies application code that calls into an intermediate method, which in turn calls into a SIMD-enabled method, then the native code is stored in shared compartment 207. A runtime check of the application's preferred mode for handling floating point calculations is performed when calls to a SIMD-enabled method are observed. If the application prefers double precision, then JIT compiler 205 emits a "call" instruction to the SIMD-enabled method. If the application prefers single precision, then JIT compiler 205 generates SIMD instructions for the SIMD-enabled method and inlines the SIMD instructions into the intermediate method.

Figure 3:
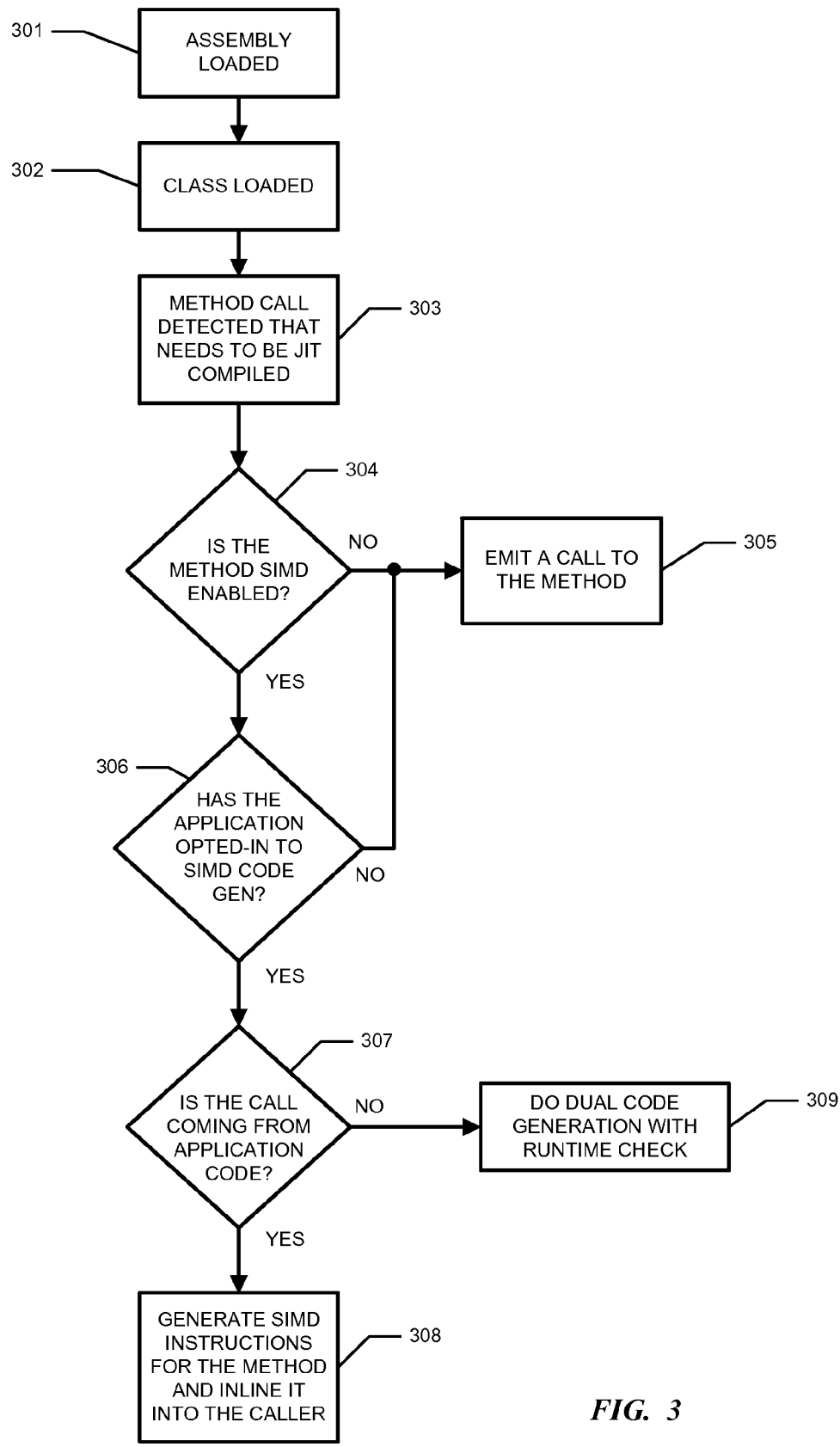
FIG. 3 is a flowchart illustrating a process for implementing dual code generation with JIT-time check.

FIG. 3 is a flowchart illustrating a process for implementing dual code generation with JIT-time check. In step 301, an assembly is loaded and, in step 302, classes are loaded to the CLR which begins running applications. In step 303, the CLR detects a method call in the application that needs to be JIT compiled. In step 304, the JIT complier evaluates whether the called method is SIMD-enabled. If the called method is not SIMD-enabled, then the process moves to step 305 where the JIT complier emits a call to the method.

On the other hand, if the method is SIMD-enabled, then the process moves to step 306 where the JIT compiler determines whether the application has opted-in to SIMD code generation. The JIT complier may make the opt-in determination in step 305 by evaluating an attribute flag, for example. If the application has not opted-in to SIMD code generation, then the process moves to step 305 and the JIT complier emits a call to the method.

If the application has opted-in to SIMD code generation as determined in step 306, the process moves to step 307 where the JIT compiler evaluates whether the call is coming from application code. If the call is determined to be from application, then the process moves to step 308 where the JIT complier generates SIMD instructions for the called method and inlines the instructions into the calling method.

If, in step 307, the call is determined to be from platform code and not from the application code, then the process moves to step 309 where dual code generation is performed with a runtime check in the shared context.

It will be understood that steps 301-309 of the process illustrated in FIG. 3 may be executed simultaneously and/or sequentially. It will be further understood that each step may be performed in any order and may be performed once or repetitiously.

Figure 4:
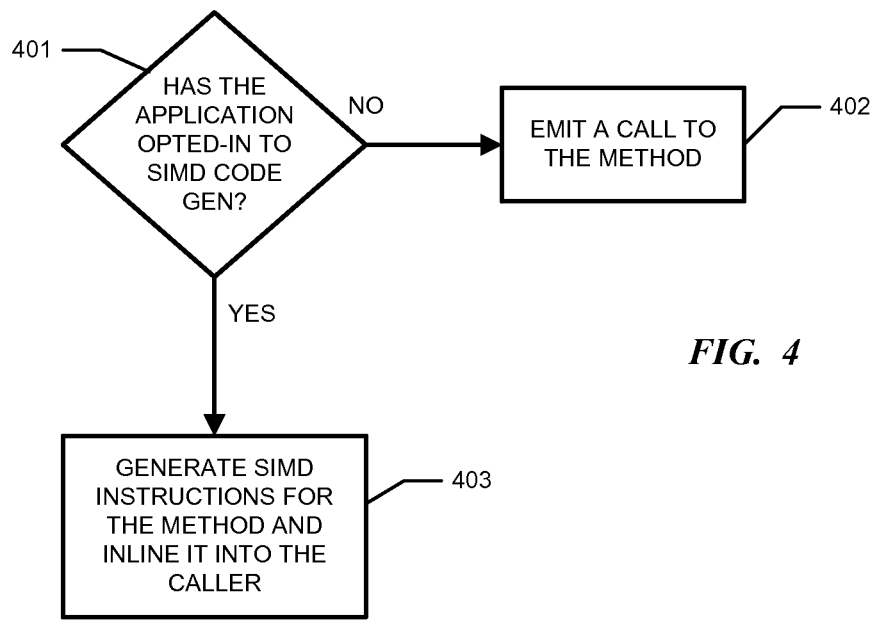
FIG. 4 is a flowchart illustrating a dual code generation process with runtime check.

FIG. 4 is a flowchart illustrating a dual code generation process with runtime check. In step 401, a method call is detected at runtime, the JIT complier then determines whether the application has opted-in to SIMD code generation.

If the application has not opted-in to SIMD code generation, then the process moves to step 402 where the JIT complier emits a call to the called method.

If the application has not opted-in to SIMD code generation, then the process moves to step 403 where the JIT complier generates SIMD instructions for the called method and inlines the instructions into the calling method.

It will be understood that steps 401-403 of the process illustrated in FIG. 4 may be executed simultaneously and/or sequentially. It will be further understood that each step may be performed in any order and may be performed once or repetitiously.

Figure 5:
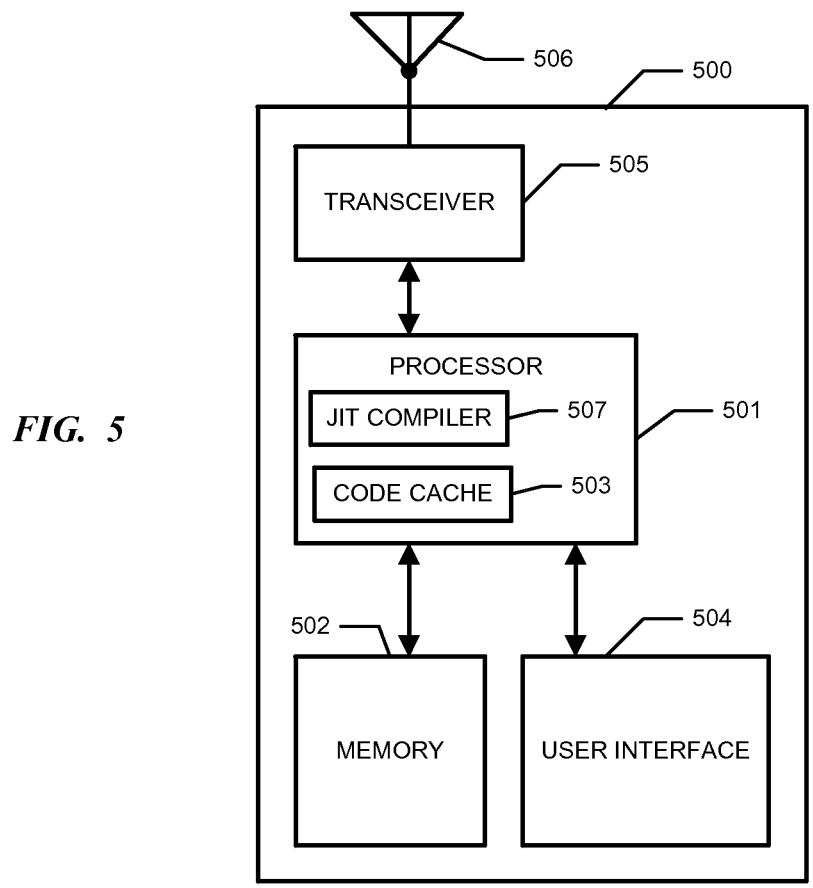
FIG. 5 is a high level block diagram of a system for implementing dual mode code generation according to one embodiment.

FIG. 5 is a high level block diagram of a system for implementing dual mode code generation according to one embodiment. Device 500 may be a mobile telephone, Personal Digital Assistant (PDA), or other portable wireless device. Processor 501 controls the operation of device 500. Memory 502 may store program instructions, such as application or client code to be run on processor 501. Processor 501 communicates with and controls user interface circuit 504, which provides data to, and receives data from, a user of device 500. User interface circuit 504 may control an input/output (I/O) interface, such as a keyboard, display, speaker, microphone, or the like. Processor 501 also communicates with and controls transceiver 505, which provides wireless communications between device 500 and an access point, base station, or other wireless devices. Transceiver 505 may provide voice and/or data communications via antenna 506, which may be an internal or external device.

Application code may be stored as a .NET assembly in memory 502. An operating system running on processor 501 loads the .NET assembly for a desired application to be run by the CLR. A JIT compiler 507 in the CLR converts CIL from the .NET assembly to native code for execution. The native code may be stored in code cache 503 so that it is available without requiring JIT-compiling each time the associated method is called. Code cache 503 may be physically or logically divided to separately store client-specific native code and shared native code. Alternatively, the CLR may track where the client-specific and shared native code is stored in code cache 503.

The client-specific native code has been checked at JIT-time to determine if the application has opted-in to SIMD code generation. On the other hand, when the shared native code is called, the application's preference for SIMD code generation is checked at runtime.

Many of the functions described herein may be implemented in hardware, software, and/or firmware, and/or any combination thereof. When implemented in software, code segments perform the necessary tasks or steps. The program or code segments can be stored in a processor readable medium. The processor readable medium may include any medium that can store or transfer information. Examples of such a processor readable medium include an electronic circuit, a semiconductor memory device, a ROM, a flash memory, an erasable ROM (EROM), a floppy diskette, a compact disk CD-ROM, an optical disk, a hard disk, a fiber optic medium, etc. For example, memory 502 and code cache 503 may be any volatile or non-volatile storage device, such as a hard drive, flash memory, solid state memory, optical disk, CD, DVD, computer program product, or other memory device, that provides computer-readable or machine-readable storage for processor 501. The code segments and .NET assembly may be downloaded or transferred via computer networks, such as the Internet or an intranet, or via other wireline or wireless networks, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   identifying, in application code, a method call enabled for Single Instruction Multiple Data (SIMD) instructions; and
   determining, based upon an attribute flag in the application code, whether the application code has opted-in to SIMD code generation, wherein
      if the application code has not opted-in, then a Just-In-Time (JIT) compiler on a processor device emits native code comprising a call instruction; and if the application code has opted-in, the JIT compiler determines whether the method call originated from the application code or from platform code.

2. The method of claim 1, further comprising:
if the method call originated from application code, generating SIMD instructions for the method.

3. The method of claim 2, further comprising:
inlining the SIMD instructions into a calling method.

4. The method of claim 1, further comprising:
if the method call originated from platform code, perform code generation with a runtime check.

5. The method of claim 4, further comprising:
determining, at runtime, whether the application code has opted-in to SIMD code generation;
if the application code has not opted-in, then emitting method call native code from a JIT compiler; and
if the application code has opted-in, generating SIMD instructions for the method.

6. The method of claim 5, further comprising:
inlining the SIMD instructions into a calling method.

7. A computer readable memory storage device storing computer executable instructions for controlling a computing device to perform a method comprising:
receiving application code for a plurality of applications at a Just-In-Time (JIT) compiler;
identifying an attribute in the application code for each of the plurality of applications to determine a code generation mode selected by each of the applications;
generating first native code for applications that selected a first code generation mode; and
generating second native code for applications that selected a second code generation mode.

8. The computer readable storage medium of claim 7, wherein the code generation mode is selected from a single-precision mode and a double-precision mode.

9. The computer readable storage medium of claim 7, wherein the code generation mode is a Single Instruction Multiple Data (SIMD) -enabled mode.

10. The computer readable storage medium of claim 9, further comprising:
generating SIMD instructions; and
inlining the SIMD instructions in the application code.

11. The computer readable storage medium of claim 7, wherein the code generation mode selected by each of the applications is determined at JIT-time.

12. The computer readable storage medium of claim 7, wherein the code generation mode selected by each of the applications is determined at runtime.

13. A method, comprising:
receiving application code for a plurality of applications at a Just-In-Time (JIT) compiler on a processor device;
identifying an attribute in the application code for each of the plurality of applications to determine a code generation mode selected by each of the applications;
generating first native code for applications that selected a first code generation mode; and
generating second native code for applications that selected a second code generation mode.

14. The method of claim 13, wherein the code generation mode is selected from a single-precision mode and a double-precision mode.

15. The method of claim 13, wherein the code generation mode is a Single Instruction Multiple Data (SIMD) -enabled mode.

16. The method of claim 15, further comprising:
generating SIMD instructions; and
inlining the SIMD instructions in the application code.

17. The method of claim 13, wherein the code generation mode selected by each of the applications is determined at JIT-time.

18. The method of claim 13, wherein the code generation mode selected by each of the applications is determined at runtime.

* * * * *